United States Patent [19]

Cox et al.

[11] Patent Number: 4,553,930

[45] Date of Patent: Nov. 19, 1985

[54] METHOD AND APPARATUS FOR THE HEAT TREATMENT OF MATERIALS

[75] Inventors: Robert W. Cox; Derek A. Jones, both of Solihull; David L. Walker, Hope Park; David Hands, Salop, all of England

[73] Assignees: British Gas Corporation, London; Rubber and Plastics Research Assoc. of GB, Salop, both of England

[21] Appl. No.: 513,142

[22] Filed: Jul. 12, 1983

[30] Foreign Application Priority Data

Jul. 17, 1982 [GB] United Kingdom ............... 8220782

[51] Int. Cl.[4] .................... F24J 3/00; B29D 29/00; A23P 1/00
[52] U.S. Cl. .................................... 432/120; 425/40; 425/547; 432/225; 432/231
[58] Field of Search ............... 432/120, 225, 226, 231; 425/40, 547

[56] References Cited

U.S. PATENT DOCUMENTS

| 943,055 | 12/1909 | Williams | 425/40 |
|---|---|---|---|
| 945,968 | 1/1910 | Mahr | 432/225 |
| 1,053,913 | 2/1913 | Hauck | 432/225 |
| 1,082,367 | 12/1913 | Stachel | 432/231 |
| 4,088,439 | 5/1978 | Dohren | 432/225 |
| 4,460,533 | 7/1984 | Cox et al. | 264/236 |

Primary Examiner—John J. Camby
Attorney, Agent, or Firm—Jim Zegeer

[57] ABSTRACT

An apparatus for the heat treatment of a product includes a metallic heat transfer assembly for transmitting heat either directly to the product or to a mould containing the product. The heat transfer assembly comprises a plurality of separate parts which are joined together either permanently or in an operationally separable manner. Each part includes a gas distribution passageway, the passageways together defining a closed loop path for receiving and circulating around the heat transfer assembly hot permanent gas from a hot gas source. One or more heat transfer passageways formed in the heat transfer assembly itself, or between the heat transfer assembly and the mould, communicate with the closed loop path in the heat transfer assembly so as to receive hot gas therefrom and lead this gas to an exhaust outlet to the atmosphere.

12 Claims, 11 Drawing Figures

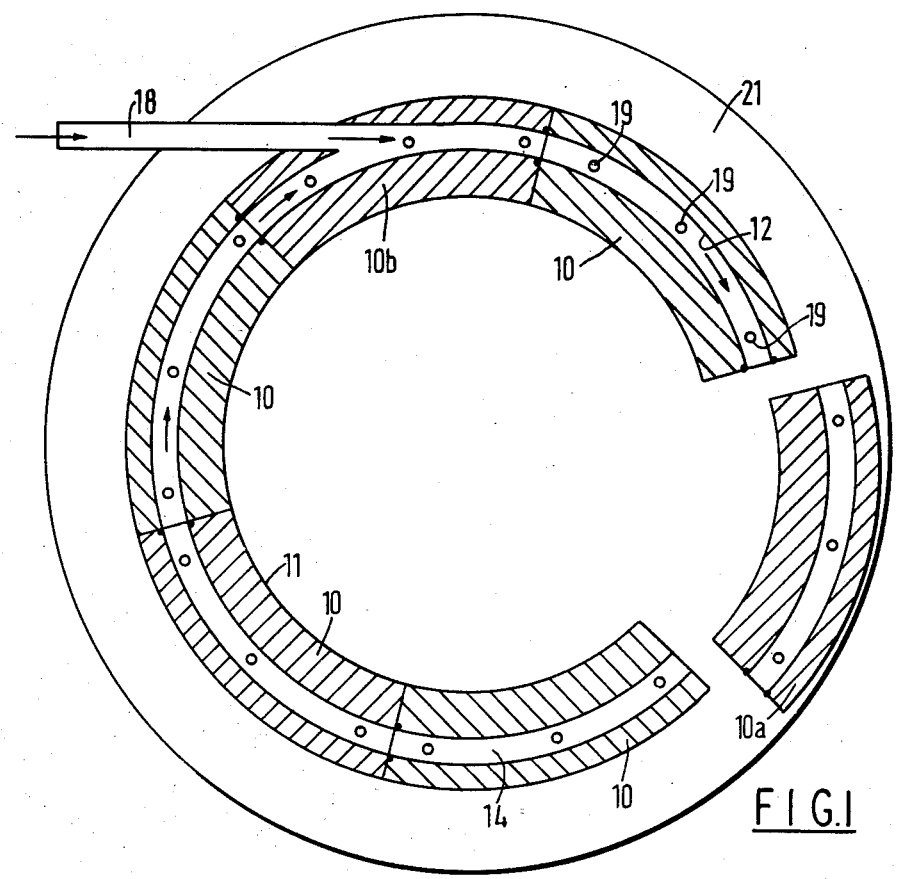
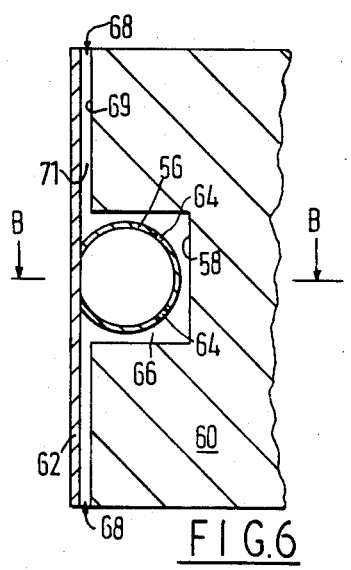
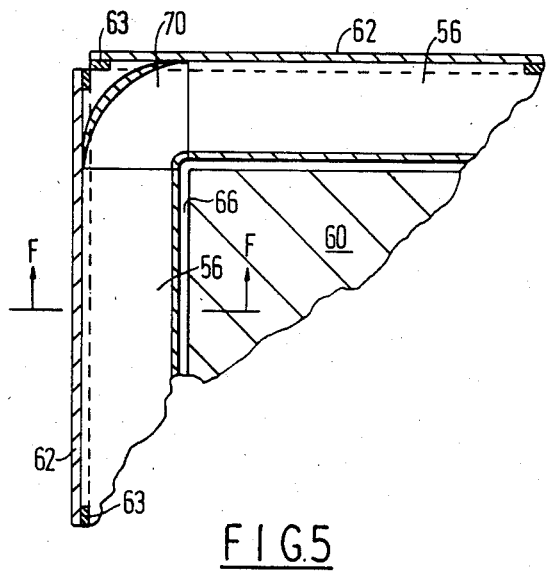

METHOD AND APPARATUS FOR THE HEAT TREATMENT OF MATERIALS

DESCRIPTION

This invention relates to treatment processes on materials wherein heat must be applied to the material, for instance in the curing of rubber-like materials and thermoforming of plastics materials, and is particularly concerned with the heating of moulds for this purpose.

The energy consumed in the UK for drying and curing purposes has been estimated at $2 \times 10^{11}$ MJ (1,900 million therms) per annum. This total can be allocated to various different market sectors of which the rubber industry is one of considerable size. A large expenditure of process energy in the case of the manufacture of natural or synthetic rubber and certain other products of the plastics class occurs in the step of curing or vulcanising. Steam is commonly used as a heat transfer medium for this process, often resulting in an inefficient utilisation of primary energy. In the worst cases, less than one tenth of the energy input to the boiler is actually transferred to the product. As a consequence of the high energy usage for curing in the rubber industries and the generally low efficiency of conversion, there is an opportunity for conservation of energy.

The manufacture of natural or synthetic rubber goods is achieved by a variety of known process routes according to the nature of the end product, which may be new tyres, hose and belting, footwear or general rubber goods. New tyres or hose, for example, require of necessity, special bracings or reinforcements disposed within a high integrity rubber compound. By way of contrast, the sole or heel of a shoe can be permitted to have inferior mechanical properties because service failure does not have such severe consequences. Despite these individual complications, the manufacturing process invariably includes a curing or vulcanising stage consisting of the application of heat.

Traditionally this heat is supplied by a centralised steam boiler remote from the process use. Wet steam is usually employed at gauge pressures between 0 and about 1.38 MPa (200 p.s.i.g.) corresponding to saturation temperatures of 100° C. and 198° C. respectively. The mould must be of suitably high mechanical integrity to withstand these pressures. Due to the high latent heat content of the steam, relatively little attention has traditionally been given to the thermal design of moulds.

An even temperature distribution at the mould/rubber interface is essential for homogeneous vulcanisation and therefore for product quality. Cold spots in the mould are traditionally avoided by the ability of the condensing steam to yield its latent heat to these areas rather than by the use of detailed mould heat transfer considerations. In this way a relatively even temperature distribution is achieved at the mould/rubber interface.

For some purposes, particularly on more modern operations, such as tyre retreading, electrical heating may be used. With this type of heat source, a constant heat flux is generated by the heating element rather than a constant temperature. As a result, thermal contact resistances, in addition to the paths of thermal resistance, become important if constant temperature mould/rubber interfaces are to be achieved.

The residence time in a mould for a given product is dependent on the rate of heat penetration into the rubber and hence its thermal diffusivity and its thickness. The low thermal diffusivity of natural or synthetic rubber, typically 0.1 mm$^2$/sec., results in mould residence times in the majority of production processes of the order of 10–100 minutes depending on the rubber dimensions and degree of vulcanisation desired, but times as low as 60 seconds for a cycle tube or as high as 24 hours for an earthmover tyre may be encountered.

A basic technique by which hot permanent gases, such as heated air, can be used for the heating of moulds or press platens is described and claimed in our previous U.K. Patent Application No. 8213213, to which reference is hereby directed. The latter Application describes an apparatus for the heat treatment of a product comprising a metallic heat transfer member for contacting the product to transmit heat thereto, a gas distribution passageway adapted to receive hot permanent gas from a hot gas source and to lead the hot gas to said heat transfer member, and one or more heat transfer passageways contiguous with said heat transfer member and communicating with said gas distribution passageway so as to receive hot gas therefrom and lead same to an exhaust outlet. This arrangement enables the attainment of a uniform temperature distribution over the heat transfer member/product interface.

The latter arrangement is particularly suited to systems where the heat transfer member or the mould does not need to be collapsed or dismantled in order to extract the moulded product.

However, other classes of mould exist where the mould has to be made in several segments or components which can be drawn back or otherwise dismantled to release the moulded product. One example of such an arrangement is the so-called "petal" mould where a plurality of segments are pivoted to a base member or frame. A problem with applying the known electric resistive heating techniques to the latter situation is that of providing a reliable connection between the segments which is capable of being repeatedly broken and remade during use. The conventional method of heating segmental and petal moulds is to enclose them totally within a separate steam jacket. The latter system therefore necessarily has the disadvantages described above which are associated with steam heating.

A further very common type of mould is of the fixed or non-segmental type which is, however, constructed by permanently securing together a number of separate segments. An example of this is the type of shell mould used to cure all sizes of bias tyres and passenger car radial tyres.

It is an object of the present invention to enable the invention of Cox et al. U.S. Pat. No. 4,460,533 (assigned to the assignee hereof) to be applied to moulds of the type where the heat transfer member or the mould itself is made up from a plurality of component parts, whether these be separable in use or permanently fixed together.

The present invention resides in an apparatus for the heat treatment of a product, the apparatus including a metallic heat transfer assembly for transmitting heat either directly to the product or to a mould containing the product, the latter assembly comprising a plurality of separate parts joined together either permanently or in an operationally separable manner, each said part including a gas distribution passageway, the latter passageways together defining a closed loop path for receiving and circulating around the heat transfer assembly hot permanent gas from a hot gas source, and one or more heat transfer passageways formed in the heat transfer assembly or between the heat transfer assembly and the mould, and communicating with said closed loop path so as to receive hot gas therefrom and lead same to an exhaust outlet.

Where the heat transfer assembly comprises a plurality of separable metallic segments, the gas distribution passageways can comprise respective bores in the segments which line up to form said closed loop gas path. In this event, the heat transfer passageways can comprise further bores or channels in the segments leading from the gas distribution bores to atmosphere. In a preferred alternative, the gas distribution passageways can comprise metal tubes contained coaxially within respective bores in the heat transfer assembly segments and spaced uniformly therefrom by means of spacers. In this event, the latter tubes contain holes by which the hot gas escapes to the space around the tubes and from there to the atmosphere via bores in the segments.

It will be noted that in such arrangements as described above where the closed loop gas path is made up from a plurality of sections, a simple butt or insertion joint (possibly aided by a simple "O" ring) is all that is necessary to achieve a satisfactory joint between adjacent sections. This is acceptable because (a) only very low gas pressures are used, normally of the order of one inch (water gauge) or 250 Pa, and (b) it is of little consequence if there is some leakage of hot gas at the joint since the gas is eventually exhausted to the surrounding atmosphere anyway.

The invention is described further hereinafter, by way of example only, with reference to the accompanying drawings, in which:

FIG. 1 is a diagrammatic sectional plan view of one embodiment of a mould assembly in accordance with the present invention;

FIG. 2c is a sectional plan view on the line KK in FIG. 2a;

FIG. 5 is a diagrammatic partial sectional plan view on the line BB of FIG. 6, of a fourth embodiment in accordance with the invention;

FIG. 6 is a partial sectional side view on the line FF of FIG. 5 or the embodiment of FIG. 5.

Figure 2:
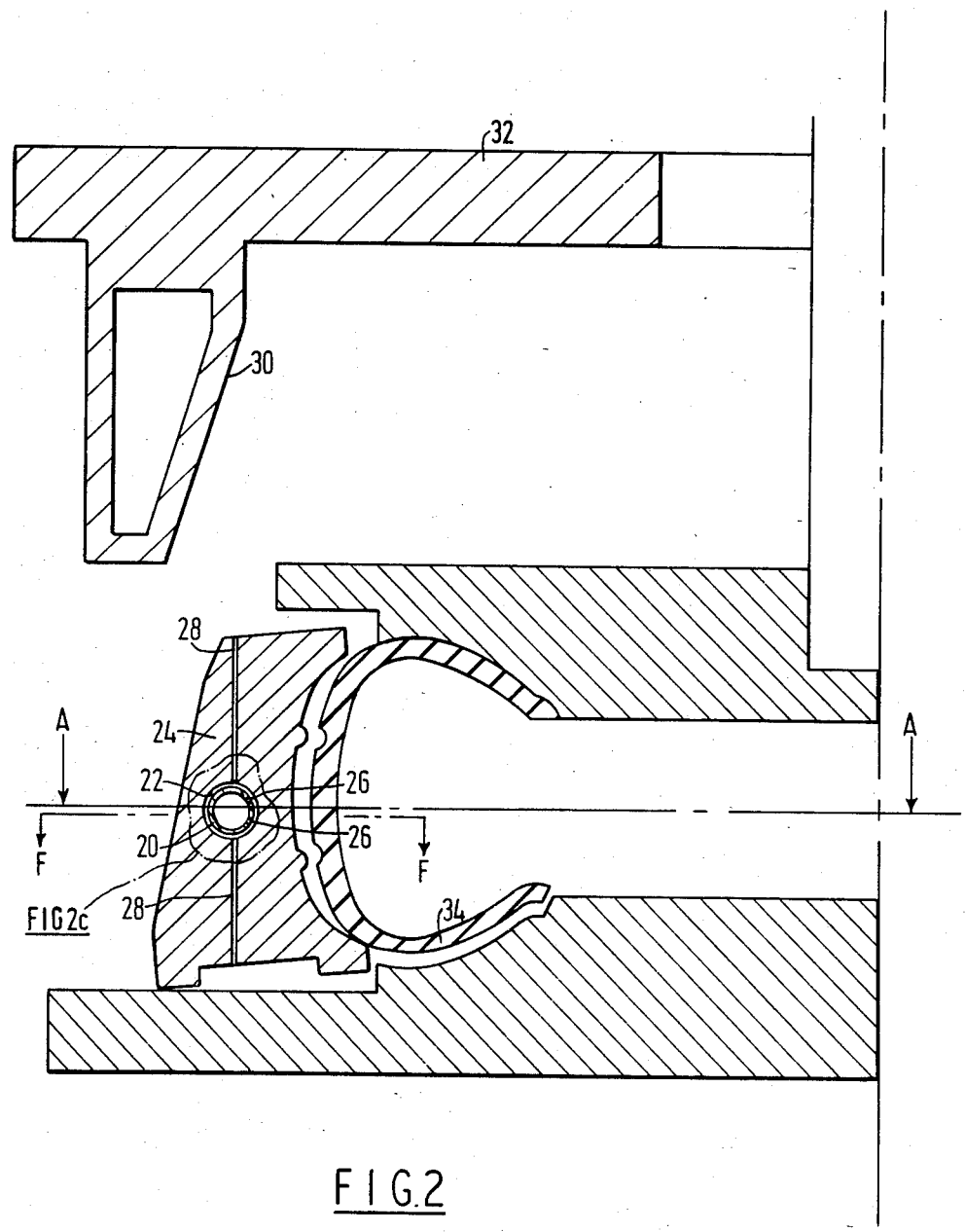
FIG. 2 is a diagrammatic, partial sectional side view of a second embodiment of a mould assembly in accordance with the present invention.

The mould of FIG. 1 comprises an assembly of metallic segments 10 which together form an annular heat transfer member whose inner surface 11 serves, in use, to form the outer periphery of a vehicle tyre (not shown). Each segment 10 contains a through-bore 12 positioned so that when the segments are assembled the bores 12 become aligned longitudinally, as shown in FIG. 1, to define a closed circular passage 14. One segment 10a in FIG. 1 is in fact shown in a withdrawn position for the purposes of illustrating the collapsibility of the mould. Another segment 10b includes a tangential inlet pipe 18 by which hot permanent gas can be supplied to the passage 14 via a nozzle (not shown) from a hot gas source (not shown), such as a burner of the type shown in our aforementioned earlier U.K. Patent Application No. 8213213. Extending from the passage 14 are a plurality of pairs of oppositely directed exhaust passages 19, (only one of each pair of passages is shown in FIG. 1 but the arrangement is similar to the exhaust passages 28 described below in connection with FIG. 2).

The segments 10 can be clamped in position, for example between parallel top and bottom platens (not shown), or can be pivoted to a common base or frame 21 in the conventional manner used in "petal" moulds. The means for pivotally mounting the segments on the base 21 is not shown as it is well known in the art.

In use, hot permanent gas is supplied at a constant rate to the internal passage 14 via the inlet 18. While passing around the closed loop formed by the passage 14, some of the gas is exhausted to atmosphere via the exhaust passage 19 at a rate equal to the rate of supply of gas to the inlet 18. The remainder of the gas is recirculated together with the incoming gas. In this way, the temperature distribution in the heat transfer member formed by the combined segments 10 can be arranged to be substantially uniform, particularly in the region of its inner peripheral surface 11, where contact is made with the material being moulded.

Figure 2C:
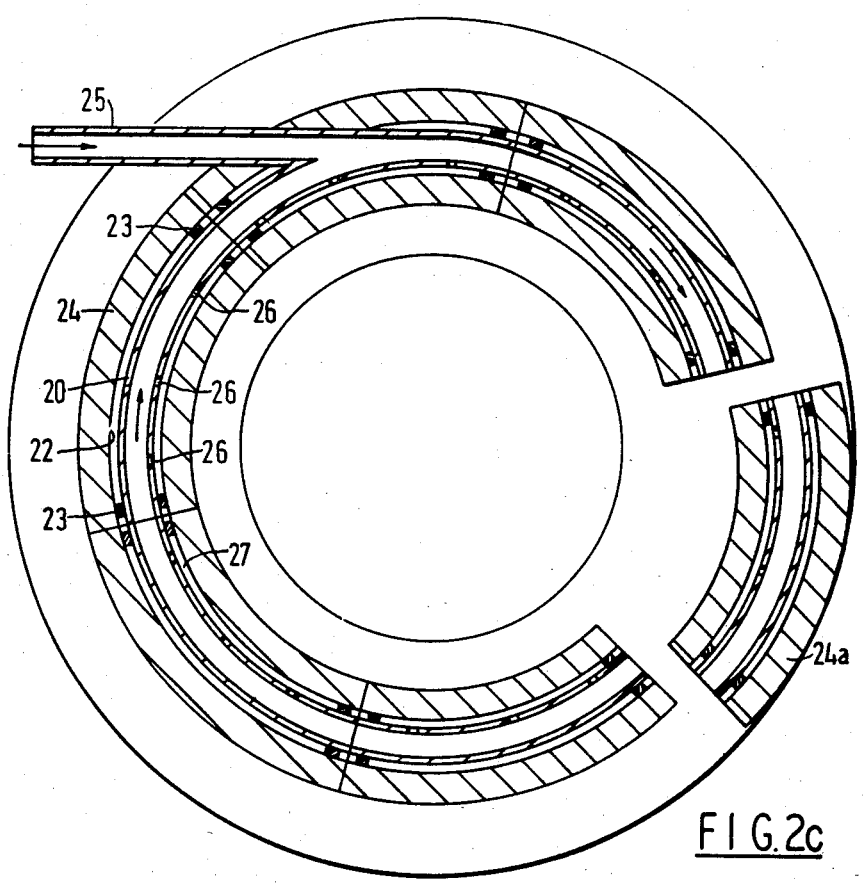
Figure 2B:
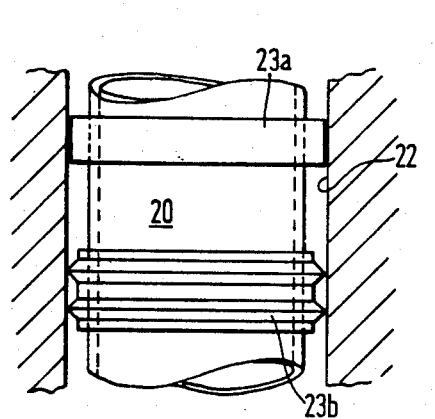
FIG. 2b is a partial plan view, corresponding to the view of FIG. 2a, to illustrate two different possible configurations for the spacers of FIG. 2.
Figure 2A:
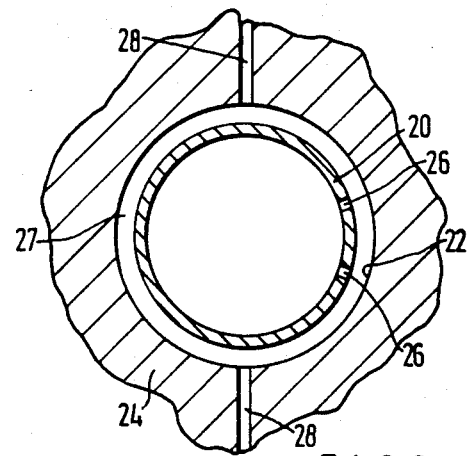
FIG. 2a is an enlarged view of the circled portion in FIG. 2.

The embodiment of FIG. 2 is similar to that of FIG. 1 except that the heat transfer passageway is formed, not by the bores in the segments themselves, but rather by pipe sections 20 which are disposed within bore sections 22 in segments 24 so as to be uniformly spaced from the walls of the bore sections 22. This can be achieved, for example, by way of suitable spacers 23 (not shown in FIG. 2—but see FIGS. 2b and 2c). As shown in the upper part of FIG. 2b, the spacers 23 can, for example, be in the form of support rings 23a of heat insulating material or, as shown in the lower part of FIG. 2b, be in the form of steel rings 23b with point or line contact with the surrounding bores 22.

The pipe sections 20 are disposed so that when the segments 24 are abutted the pipe sections are axially aligned so as to define a closed circular path for the gases which enter in a similar manner to the embodiment of FIG. 1, via a tangential pipe section 25 in one of the segments.

In this case, the pipe sections 20 each contain one or more bores 26 by which the hot gas leaves the circular pipe formed by the pipe sections 20, and enters the annular space 27 therearound before being exhausted to atmosphere via further pairs of oppositely directed bores 28.

The assembly shown in FIG. 2 comprises a plurality of the segments 24 which are arranged to be aligned and held in position during a moulding operation by means of a frusto conical surface 30 on a clamping member 32 which can be forced over the mould. Removal of the clamping member 32 allows the segments 24 to be withdrawn to permit removal of the finished product 34.

The use of the latter arrangement is preferred to that of FIG. 1 in that a more uniform temperature at the mould/product interface has been found to be attained in practice.

It will be noted that in both the embodiment of FIG. 1 and that of FIG. 2 no special sealing arrangement is necessary at the interface between each pair of adjacent segments since it is not significantly detrimental to the system if hot gas escapes at these joints.

Figure 4:
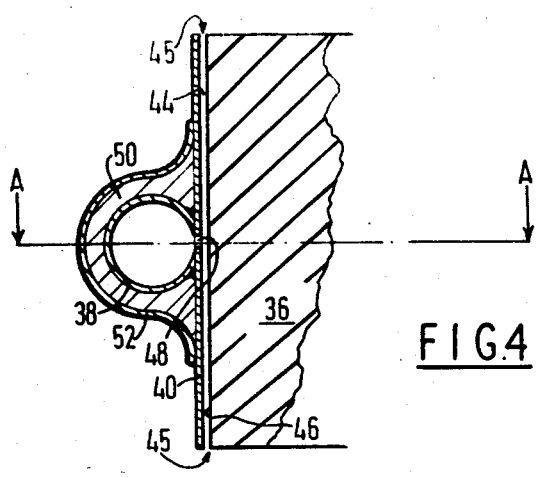
FIG. 4 is a partial diagrammatic sectional side view on the line EE of FIG. 3 of the embodiment of FIG. 3.
Figure 3:
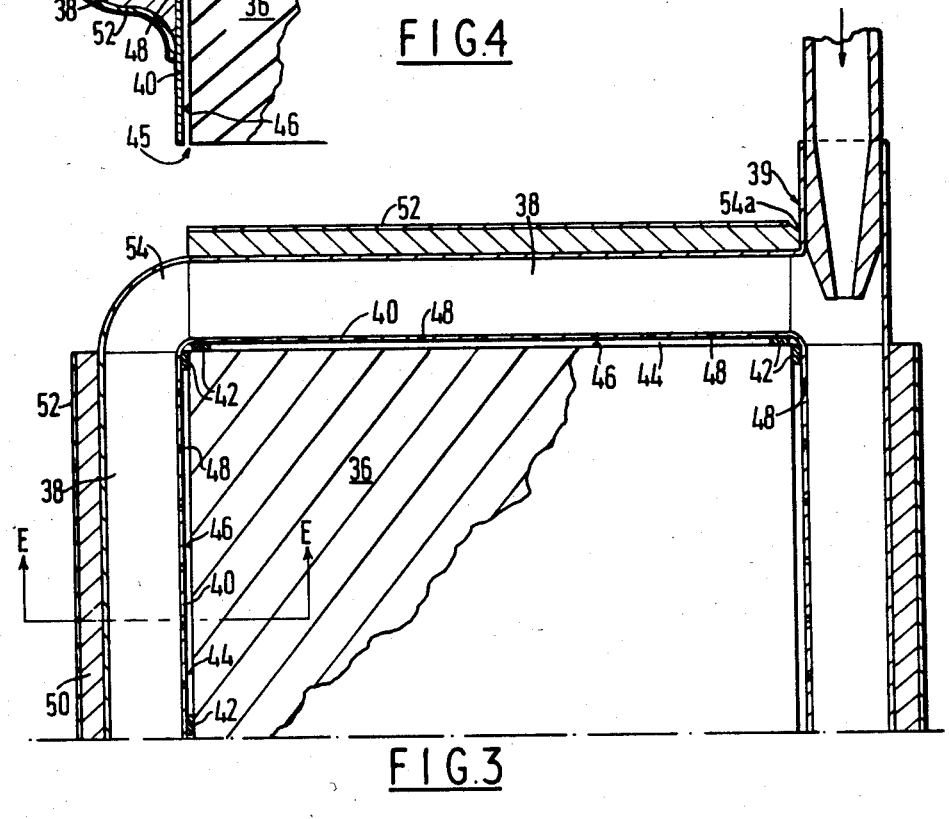
FIG. 3 is a partial diagrammatic sectional plan view on the line AA of FIG. 4 of a third embodiment in accordance with this invention.

In the embodiment of FIGS. 3 and 4 the external configuration of the mould is unimportant and in this instance is shown merely as a block 36. In practice such a mould would be capable of being opened into a number of pieces to allow removal of the product.

Conventionally, the mould 36 would be heated by placing it in a heated press or by placing the closed mould in an oven. The present invention can be applied to this arrangement by mounting on four sides of the mould 36 separate hot air-carrying pipe sections 38 which are joined at the four corners of the mould to define a closed loop as before. Each pipe section 38 is rigidly fixed, for example by silver soldering, to a metal plate 40 which is itself mounted to a respective side of the mould 36 so as to be uniformly spaced therefrom by means of spacers 42. Thus, a uniform space 44 is defined between the plate 40 and the adjacent surface 46 of the mould 36. The latter space 44 is in communication with the interior of the pipe section 38 by way of a plurality of holes 48. Each pipe section 38 can be surrounded by a mass of insulating material 50 contained within a protective metal cover 52.

The adjacent ends of the pipe sections 38 are connected together by means of coupling sections 54 which, for example, may be connected to one pipe section 38 and form a butt or insertion joint with the other pipe section 38 when the pipe sections are assembled on the mould. For introducing the hot gas, one of the coupling sections 54a has a tangential inlet portion 39 (see right-hand side of FIG. 3) corresponding to the inlet member 18 of FIG. 1.

In this embodiment, hot gas is again circulated in the loop formed by the mated pipe sections 38 and gradually leaves via the bores 48, the space 44 and apertures 45 at the axial ends of the space 44 whereby the gas is exhausted to atmosphere.

The embodiment of FIGS. 5 and 6 is similar to that of FIGS. 3 and 4 except that the pipe sections 56 are contained within recesses 58 in the walls of the mould 60. The pipe sections 56 are rigidly fixed to metal plates 62 which are uniformly spaced from the adjacent side walls of the mould by spacers 63. Hot gas leaves the pipe sections 56 via holes 64 and enters a space 66 between the pipe and the mould before exhausting to atmosphere via exit ports 68 at the axial ends of the space between the plate 62 and the mould. The side plates 62 can extend over the coupling pieces 70 as shown in FIG. 5 or can terminate at the ends of the pipe sections 56.

In a modification of the embodiment of FIGS. 5 and 6, the plates 62 need not necessarily be directly connected to the pipe sections 56 but can be physically separate therefrom.

Figure 7:
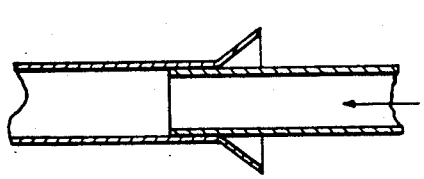
FIGS. 7 and 8 show two possible forms of injection joints for interconnecting the pipe sections.
Figure 8:
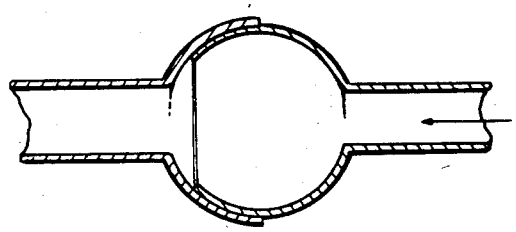

Although as mentioned above the present apparatus can operate satisfactorily with simple butt joints between the separate segments of the heat transfer system, in some cases it may be preferred to improve the seal somewhat without going to the extent of attempting to provide a totally gas-tight joint. Two possibilities are illustrated diagrammatically in FIGS. 7 and 8 wherein mating insertion joints are formed at the connection between two pipe sections which are to be joined. In each case, the gas flow direction is illustrated by an arrow.

We claim:

1. In an apparatus for the heat treatment of a product, including a metallic, generally annular heat transfer members for transmitting heat to the product, the latter members comprising a plurality of separate segments joined together in an operationally separable manner, the improvement comprising means defining a respective gas distribution passageway within each said segment, means defining exhaust outlets in said segments, said passageways together defining a closed loop path for receiving and circulating around the heat transfer members hot permanent gas from a hot gas source, and at least one elongate heat transfer passageway formed within each said segment of the heat transfer assembly, one end of each said passageway communicating with said closed loop path defined by the gas distribution passageways and the other end communicating with atmosphere via said exhaust outlet.

2. An apparatus according to claim 1, wherein said gas distribution passageways comprise metal tubes contained coaxially within respective bores in said heat transfer assembly segments and spaced uniformly therefrom by means of spacers.

3. An apparatus according to claim 2, wherein said metal tubes contain holes by which the hot gas escapes to the space around the tubes and from there to the atmosphere via said heat transfer passageways.

4. An apparatus as claimed in claim 2, wherein said spacers comprise annular rings of heat insulating material disposed at circumferentially spaced positions around said tubes.

5. An apparatus as claimed in claim 2, wherein the spacers are metallic annular rings having line contact with said surrounding bores.

6. An apparatus for the heat treatment of a product, comprising a metallic heat transfer assembly for transmitting heat to mould means including a mould surface bounding said product to thereby transfer heat to said product, said mould means comprising a plurality of hollow pipe sections joined together in an operationally separable manner so as to define a closed loop path for receiving and circulating around the heat transfer assembly hot permanent gas from a hot gas source, and at least one elongate heat transfer passageway formed between the assembly of pipe sections and said mould and communicating with said closed loop path so as to receive hot gas therefrom and lead same to an exhaust outlet wherein each pipe section of said heat transfer assembly is attached to a respective metal plate mounted adjacent to an external surface of said mould and separated therefrom by an air gap forming at least one said heat transfer passageway, the interior of the pipe section being connected to said air gap via holes in the pipe section and in said plate.

7. An apparatus according to claim 6, wherein in their assembled state said pipe sections are interconnected by simple insertion joints.

8. An apparatus for the heat treatment of a product, comprising a metallic heat transfer assembly for transmitting heat to mould means including a mould surface bounding said product to thereby transfer heat to said product, said mould means comprising a plurality of hollow pipe sections joined together in an operationally separable manner so as to define a closed loop path for receiving and circulating around the heat transfer assembly hot permanent gas from a hot gas source, and at least one elongate heat transfer passageway formed between the assembly of pipe sections and said mould and communicating with said closed loop path so as to receiving hot gas therefrom and lead same to an exhaust outlet wherein each said pipe section of said heat transfer assembly is received in a respective recess in the mould periphery and being attached rigidly to a respective metal plate mounted adjacent to an external surface of the mould and separated therefrom by an air gap forming at least one said heat transfer passageway, the interior of the pipe section being connected to said air gap via holes in said pipe section.

9. An apparatus for the heat treatment of a product comprising a generally annular heat transfer assembly for transmitting heat to said product, said assembly comprising a plurality of separate metal heat transfer segments joined together, each segment having gas distribution passageways therein, said gas distribution passageways together defining a closed loop path for receiving and circulating through said heat transfer assembly hot permanent gas from a hot gas source, each said gas distribution passageway comprising a metal tube contained coaxially within and spaced uniformly from a first bore in said segment, means defining exhaust outlets in said segments, and at least one elongate heat transfer bore formed in and extending through each said segment, one end of each said heat transfer bore communicating with said closed loop path and the other end communicating with atmosphere via a respective one of said exhaust outlets.

10. In a method of heat treating a product comprising, transferring heat from hot permanent gas to a metallic heat transfer member by passing hot permanent gas through a gas distribution passageway which extends in a closed loop along the metallic heat transfer member such that the hot permanent gas is directed over said metallic heat transfer member, then passing the hot permanent gas along at least one heat transfer passageway to transfer heat to said heat transfer member and then to exit through an exhaust outlet to ambient atmosphere and bringing the product to be treated into contact with said heat transfer member to tansmit heat to the product; the improvement wherein:
said metallic heat transfer member, said hot permanent gas distribution passageway and said heat transfer passageway are constituted by a plurality of discrete segments, respectively, operatively jointed together so that said hot permanent gas distribution passageway forms said closed loop, and causing said hot permanent gas to be at a relatively low gas pressure so that any leakage of hot permanent gas at the points where said discrete segments are jointed together is minimized and any such joint leakage is to ambient atmosphere and each discrete segment of said metallic heat transfer member is uniformly heated by said hot permanent gas.

11. The invention defined in claim 10 wherein said heat transfer gas is supplied at a constant rate and while passing around said closed loop some of said hot gas is exhausted to ambient atmosphere, including said joint leakage, at a rate equal to the rate of supply of said hot gas with the remainder of said hot gas being recirculated in said closed loop, constituted by said plurality of segments whereby each segment of said metallic heat transfer member is uniformly heated by said hot permanent gas.

12. An apparatus for heat treating a product by the process of transferring heat from hot permanent gas to a metallic heat transfer member, said apparatus comprising means for passing said hot permanent gas through a gas distribution passageway which extends in a closed loop along the metallic heat transfer member such that the hot permanent gas is directed over said metallic heat transfer member, including means for passing the hot permanent gas along at least one heat transfer passageway to transfer heat to said heat transfer member, and means forming an exhaust outlet to ambient atmosphere, means for bringing the product to be treated into contact with said heat transfer member to transmit heat to the product; the improvement wherein:
said metallic heat transfer member, said hot permanent gas distribution passageway and said heat transfer passageway are constituted by a plurality of discrete segments, respectively, means at the ends of each discrete segment operatively jointing each discrete segment together, respectively, so that said hot permanent gas distribution passageway forms said closed loop for the circulation of said hot permanent gas therein, and means for aligning and maintaining said discrete segments in said closed loop.

* * * * *